United States Patent
Zhao et al.

(10) Patent No.: US 6,823,102 B2
(45) Date of Patent: Nov. 23, 2004

(54) HIGHLY STABLE OPTO-MECHANIC SWITCHES

(75) Inventors: Jing Zhao, Wobum, MA (US); Yongjun Shu, Woburn, MA (US)

(73) Assignee: Agiltron, Inc., Wilmington, MA (US)

(*) Notice: Subject to any disclaimer, the term of this patent is extended or adjusted under 35 U.S.C. 154(b) by 163 days.

(21) Appl. No.: 10/199,684

(22) Filed: Jul. 22, 2002

(65) Prior Publication Data

US 2004/0013351 A1 Jan. 22, 2004

(51) Int. Cl.⁷ ............................................. G02B 6/42
(52) U.S. Cl. ............................. 385/22; 385/15; 385/16; 385/36
(58) Field of Search ......................... 385/22, 15–18, 385/24, 31, 33, 36; 398/80, 81

(56) References Cited

U.S. PATENT DOCUMENTS

| | | | |
|---|---|---|---|
| 4,208,094 A | 6/1980 | Tomlinson, III et al. | |
| 4,220,396 A | 9/1980 | Antell | |
| 4,239,330 A | 12/1980 | Ashkin et al. | |
| 4,239,331 A | 12/1980 | Aoyama | |
| 4,303,303 A | 12/1981 | Aoyama | |
| 4,322,126 A | 3/1982 | Minowa et al. | |
| 4,447,118 A | 5/1984 | Mulkey | |
| 4,452,507 A | 6/1984 | Winzer | |
| 4,626,066 A | 12/1986 | Levinson | |
| 4,634,239 A | 1/1987 | Buhrer | |
| 4,789,215 A | 12/1988 | Anderson et al. | |
| 4,790,621 A | 12/1988 | Calaby et al. | |
| 4,896,935 A | 1/1990 | Lee | |
| 4,938,555 A | 7/1990 | Savage | |
| 5,000,534 A | 3/1991 | Watanabe et al. | |
| 5,028,104 A | 7/1991 | Kokoshvili | |
| 5,042,889 A | 8/1991 | Benzoni | |
| 5,361,315 A | 11/1994 | Lewis et al. | |
| 5,436,986 A | 7/1995 | Tsai | |
| 5,838,847 A | 11/1998 | Pan et al. | |
| 5,943,454 A | 8/1999 | Aksyuk et al. ............ 385/22 |
| 6,215,919 B1 * | 4/2001 | Li et al. ................... 385/16 |
| 6,597,829 B2 * | 7/2003 | Cormack ................. 385/22 |
| 2003/0108278 A1 * | 6/2003 | Chang .................... 385/21 |

* cited by examiner

*Primary Examiner*—Daniel Stcyr
*Assistant Examiner*—Daniel A. Hess
(74) *Attorney, Agent, or Firm*—Lumen IPS; Ron Jacobs; Marek Alboszta

(57) ABSTRACT

The present invention provides improved optical switches in which only a spatial beam shifting of a small free space offset is required to direct optical pathways between plural fiber ports. This is achieved by spacing two fibers closely and collimating their beams with one imaging lens for compactness. Advantageously, the inventive switches incorporate beam correcting devices to render the beam propagations parallel, allowing light beams to be efficiently coupled into two fibers that share a single lens with substantially improved stability.

14 Claims, 3 Drawing Sheets

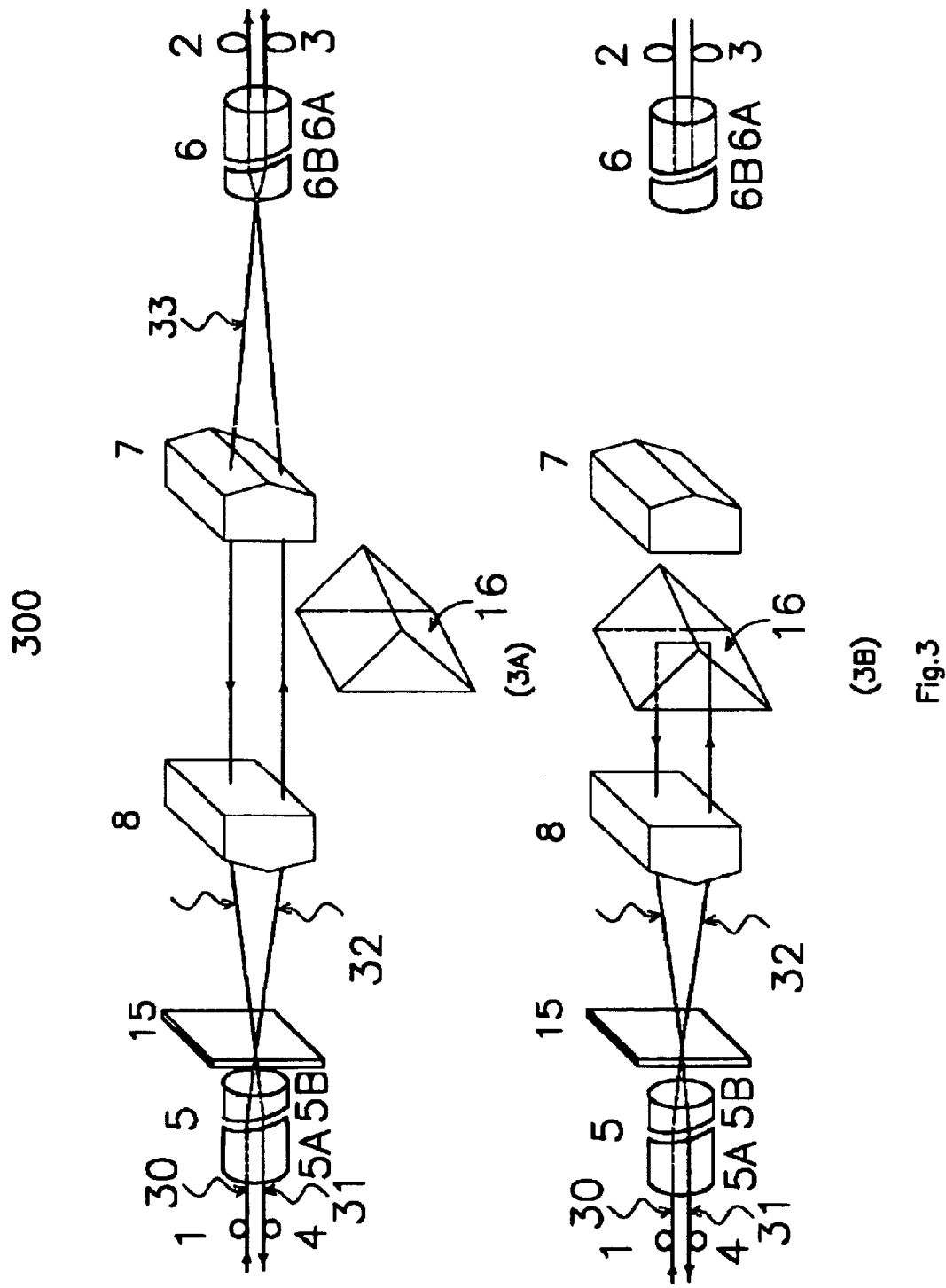

HIGHLY STABLE OPTO-MECHANIC SWITCHES

FIELD OF THE INVENTION

The present invention is related to optical devices; more particularly, the invention relates to mechanical optical switches.

BACKGROUND OF INVENTION

The optical switch is a device for directing optical signals along selected fibers of an optical network, in which light signals are transmitted along optical fibers to transfer information from one location to another. Desirable optical switch properties include: high speed switching, low optical insertion loss, good repeatability, long operation lifetime, small size, and low cost. The optical switch is a key component in today's optical networks, analogous to the electrical switches in electrical networks. However, it has not been widely adopted because of lack of reliability and high cost associated with fabrication difficulty.

Mechanical fiber optic switches using movable light guiding elements for alternating optical beam paths to effectuate switching are the dominant optical switching component used in current telecommunication systems. This is because, in comparison with other means, mechanical optical switches are simpler in construction and impose smaller distortions on the optical signals. For example, current non-mechanical switching technologies are based on changes of either optical phase or polarization. Consequently they have intrinsic drawbacks of polarization and wavelength dependence and induce signal distortions that become problematic as the channel count and transmission speed increase in next generation network systems.

In an optical switch, a light signal must be accurately entered into an optical fiber, or much of the signal strength will be lost. The alignment requirements of modern single mode optical fibers are particularly stringent, as their core diameters are typically as small as 2 to 10 micrometers and their acceptance angle is fairly narrow. For optical switches, alignment and maintenance of precision optical paths have been the main technical difficulty, since a slight misalignment can cause large insertion losses. Therefore, the cost and reliability of mechanical optical switches are primarily determined by the fiber alignment/package design.

Prior mechanical optical switch designs incorporate fiber collimator lenses, such as Graded Refractive Index (GRIN) lenses, to increase the alignment tolerance to some extent. The collimator tenses enlarge the optical beams at least ten to one-hundred times larger so that insertion losses will not significantly increase when there is a few micrometers of misalignment between the light path from the input fiber to the output fiber. However, the use of individual collimator lenses disadvantageously increases the separation between adjacent fibers, resulting in the need for large beam displacement for light path switching. Consequently, mechanical optical switches using individual fiber collimators have suffered from slow switching speeds and poor stability. An example of such an optical system is disclosed in U.S. Pat. No. 5,642,446.

A more recent version as described by Li et al. in U.S. Pat. No. 6,215,919 represents so me improvement by using a dual fiber collimator in which two fibers are placed next to each other and share a single imaging lens, substantially reducing the beam separation and overall device size. A disadvantage of Li's switch is that the beam propagations are not parallel, and are instead at an angle. Consequently the switch demands precise fabrication of a moveable prism with matching wedges that not only precisely displaces the beam path but also must satisfy tight angular deflection relations. As a result, this type of switch requires high precision for maintaining accurate alignment of each optical path, in which the angular and the spatial positions are interrelated. This type of switch is therefore often very difficult and costly to make and its operation is less stable.

For the above reasons, current mechanical optical switches are expensive to produce and prone to fail with a short operation lifetime.

OBJECTS AND ADVANTAGES OF THE INVENTION

Accordingly, it is an object of the invention to provide a type of mechanical optical switch that utilizes compact optical elements and is insensitive to both angular variations and position shifts of the moveable light-guiding element. The present inventive mechanical optical switches therefore provide critical advantages of switching a light beam between an input fiber and output fibers with unprecedented stability and longevity against environmental perturbations and wear-out.

It is a further object of the invention to provide a type of mechanical optical switch which requires significantly reduced alignment steps having large assembly tolerances that is suitable for low-cost volume production, The above objects and advantages, as well as numerous improvements attained by the apparatus and method of the invention are pointed out below.

SUMMARY OF THE INVENTION

It is an object of the present invention to provide a compact and economical optical switch that can be efficiently coupled to plural optical fibers such that these light couplings are less sensitive to misalignment of the movable light guiding switching element. The invention provides optical switches having at least three ports for optical fibers. The inventive switches use at least one single lens for coupling two fibers for compactness. The invention includes a light-bending device, situated to compensate for the angle between the two light beams that share the same lens, by advantageously rendering them parallel. The inventive switches rely on spatially shifting light propagation of parallel beams, desirably increasing alignment tolerance and thus stability and longevity.

BRIEF DESCRIPTION OF THE DRAWINGS

FIGS. 3A–B are schematic views of a mechanical four-port wavelength add/drop switch according to the principles of a third embodiment of the present invention, and illustrate the arrangement of each element within the switch body for this third embodiment.

DETAILED DESCRIPTION OF THE SPECIFIC EMBODIMENTS

Figure 1:
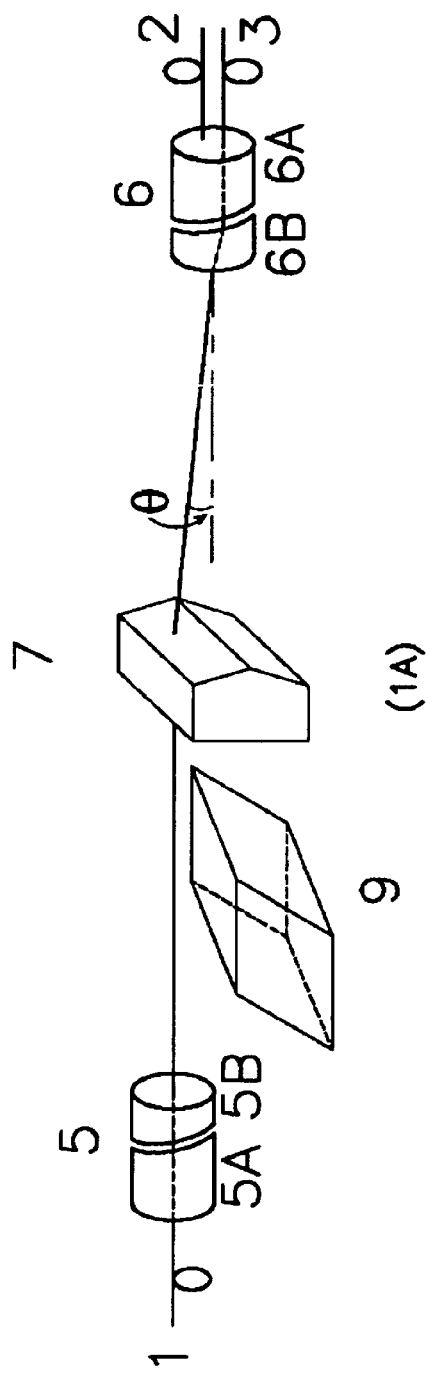
FIGS. 1A–1B are schematic views of a mechanical 1×2 switch according to the principles of a first embodiment of the present invention, and illustrate the arrangement of each element with in the switch body for this first embodiment.
Figure 1:
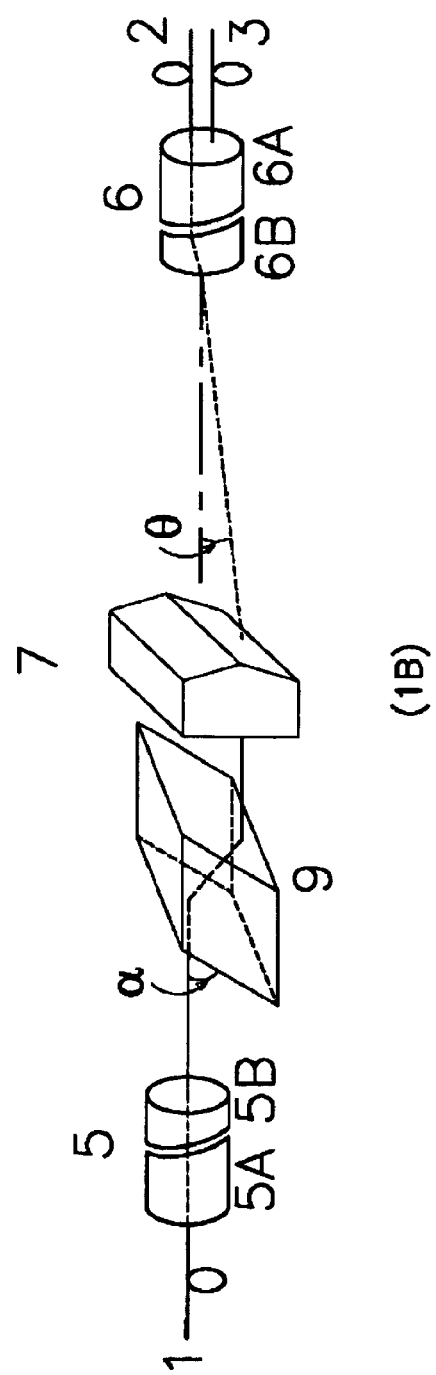

The inventive mechanical optical switches are based on an improved optical fiber packaging platform, wherein a closely spaced dual collimator coupled with an angular correction prism forms a small separation and parallel beam propagation configuration, as shown in FIGS. 1A–B, 2A–B, and 3A–B. This invention has several advantages over prior mechanical optical switches. First, since two optical fibers on the same side are placed next to each other, the resulting small beam separation significantly reduces the required traveling distance of the moving element. Second, only one lens that can be shared by a pair of fibers is used on each side of the switch, leading to fewer optical elements and a smaller footprint in comparison with conventional switches. Conventional optical switches have a bulky arrangement wherein each optical port has its own individual imaging element. Third, the incorporation of a beam angle correction system (e.g., 7 and 8 on FIGS. 2A–B) compensates the angle separation between the two beams from the same imaging lens and advantageously renders them parallel. The resulting parallel beam arrangement significantly increases the tolerance of the moveable switching light guiding element to misalignment. Moreover, an advantage of having an angular tuning element is that it substantially allows independent adjustment of position and angle for maximum light coupling. As a result, this inventive configuration greatly increases the switching reliability, and therefore significantly increases the device operational life time. Due to the loose tolerance requirement and independent position and angular alignment, the inventive configuration also greatly reduces the packaging difficulty, and therefore is particularly suitable for volume production. The inventive optical switch's increased tolerance further provides improvement in device thermal stability.

In one aspect of the invention, an optical signal can be reliably switched between two optical paths. In another aspect of the invention, a selected wavelength channel from a data trunk can be reliably switched between a pass-through state and an add/drop state in a four-port reconfigurable wavelength add/drop configuration. The inventive optical switches are a general light control device. The inventive optical switches may be used in telecommunications systems/sub-systems, such as in WDMs, EDFAs, add-drop multiplexers, dispersion compensators, network switches, network protection and restoration devices, and OTDRs. The inventive optical switch may also be used in other optical networks, such as sensors and computers. These and other advantages of the inventive optical switches are elaborated in the specific embodiments now described.

The present invention will be further described in terms of several optical switch embodiments having specific components and having a specific configuration. However, one of ordinary skill in the art will readily recognize that this method and system will operate effectively for other components having similar properties, other configurations, and other relationships between components.

To more particularly illustrate the method and system in accordance with the present invention, refer now to FIGS. 1A–B, depicting a first embodiment of a one-by-two fiber optic switch 100 incorporating aspects of the invention. FIG. 1A depicts a light path from a fiber 1 to a fiber 3 and FIG. 1B depicts a light path from fiber 1 to a fiber 2. The invention relates to an optical switch comprising several optical components which are optically coupled along the longitudinal axis: a first fiber collimator 5 that expands and collimates a light beam from fiber 1; a movable beam shifter 9 for switching light paths between 1 to 3 and 1 to 2; a beam angle deflector 7 which deflects all beams with a correction angle, such that both optical paths are propagating parallel; and a dual fiber collimator 6 that collimates two beams with one shared imaging lens. The switch described here is a simple opto-mechanical device in which the light beam goes to one fiber without beam shift element 9 in the path and goes into another fiber when the beam shift element 9 is placed in the light path. A conventional electrical actuator can be used to move the beam shifter in and out the beam path, which consequently switches light from one port to another port. Due to the improved design, the precision requirement of the actuator is substantially reduced. The following provides details of the drawings.

As shown in FIG. 1A, a first optical fiber 1 is inserted in to a first glass capillary 5A. Fiber 1 emits a light beam that is collimated by lens 5B. Optically aligned capillary 5A and lens 5B form collimator 5. Opposite first fiber 1, a second optical fiber 2 is inserted into a second glass capillary 6A and a third optical fiber 3 is inserted into the same glass capillary 6A adjacent to fiber 2. Light beams to or from fiber 2 and fiber 3 are collimated by lens 6B. Optically aligned capillary 6A and lens 6B form a dual collimator 6.

Lens 6B causes beams from port 2 and port 3 to make an angle θ with respect to the y-axis. A polarization-independent light-bending device 7 is incorporated to correct this angle of propagation by bending each beam at an angle θ with respect to the y-axis. Therefore, light beam propagations from port 2 and port 3 become parallel to each other after device 7.

Consider a first switching state in which the light path is from port 1 to port 3, as indicated by the solid beam propagation line in FIG. 1A. In this light path state, the light beam is directly coupled to port 3 via collimator 6. The movable beam displacement element 9 is out of the light path.

Next, consider a second switching state in which the light path is from port 1 to port 2, as shown in FIG. 1B by the dotted beam propagation line. Fiber 1 emits a light beam that is collimated by lens 5B. The light beam then passes through beam displacement element 9 which displaces the beam by a distance that matches the parallel beam separation. Consequently an optical path from fiber 1 to fiber 2 is established when the beam displacement element 9 is placed in the light path.

The general requirement for the beam shifter 9 is that it shifts the transmitted light beam by a particular distance without making an angle deflection. One preferred embodiment of device 9 is a parallel plate that is inclined at an angle with respect to the beam path, as shown in FIG. 1B. A light beam enters the parallel plate 9 through a first face and exits the plate through a second face without undergoing any internal reflections. Beam displacement is accomplished via surface refractions due to index difference. The plate is oriented at an angle α to light beam propagation such that:

$$d = \frac{L}{\cos\left(\arcsin\left(\frac{1}{n} \cdot \cos\alpha\right)\right)} \cdot \cos\left(\alpha + \arcsin\left(\frac{1}{n} \cdot \cos\alpha\right)\right)$$

where d is the beam displacement that matches the parallel beam separation, n is the refractive index of the plate, and L is the plate thickness. From the above equation, it is straightforward to calculate that the inventive design has a high stability. The beam displacement is independent of the spatial position of beam shifter 9, as long as it covers the beam size and an angle misalignment in α of up to 1 degree does not produce substantial optical coupling loss due to the parallel diffraction design.

This beam deflector design offers an attractive feature in which the beam displacer 9 can be mass-produced by simply cutting a disk having two parallel antireflection coated surfaces. Furthermore, in assembly, the angle α can be adjusted so that the beam displacement is precisely matched with the beam separation of the dual collimator, achieving optimal optical coupling. Most importantly, the inventive configuration substantially reduces the tight assembly tolerance requirement that is often associated with conventional optical switches. This is because the optical loss is less sensitive to the slight misalignment of the movable deflector 9. Conventional mechanical optical switches either require a large movable prism due to the large beam separation such as in U.S. Pat. No. 6,215,919, or require a complex moveable prism which must simultaneously maintain precise beam displacement and tight angular deflection relations such as in U.S. Pat. No. 6,215,919.

Device 9 is made of a parallel plate of a homogenous transparent solid. A large index of refraction is preferred to reduce the beam shifter size. One example is polycrystalline ZnSe which is isotropic and has a large index of refraction of 2.4 at the communication mid IR band.

One preferred embodiment of device 7 is a tapered glass prism, whose angle is adjusted so that beams entering from fiber port 2 or 3 are rendered parallel to the y-axis as the beams exit device 7. One specific embodiment of a roof glass prism is illustrated in FIGS. 1A–B, 2A–B, and 3A–B. Other shapes and constructions of prisms can also perform the same function.

Figure 2:
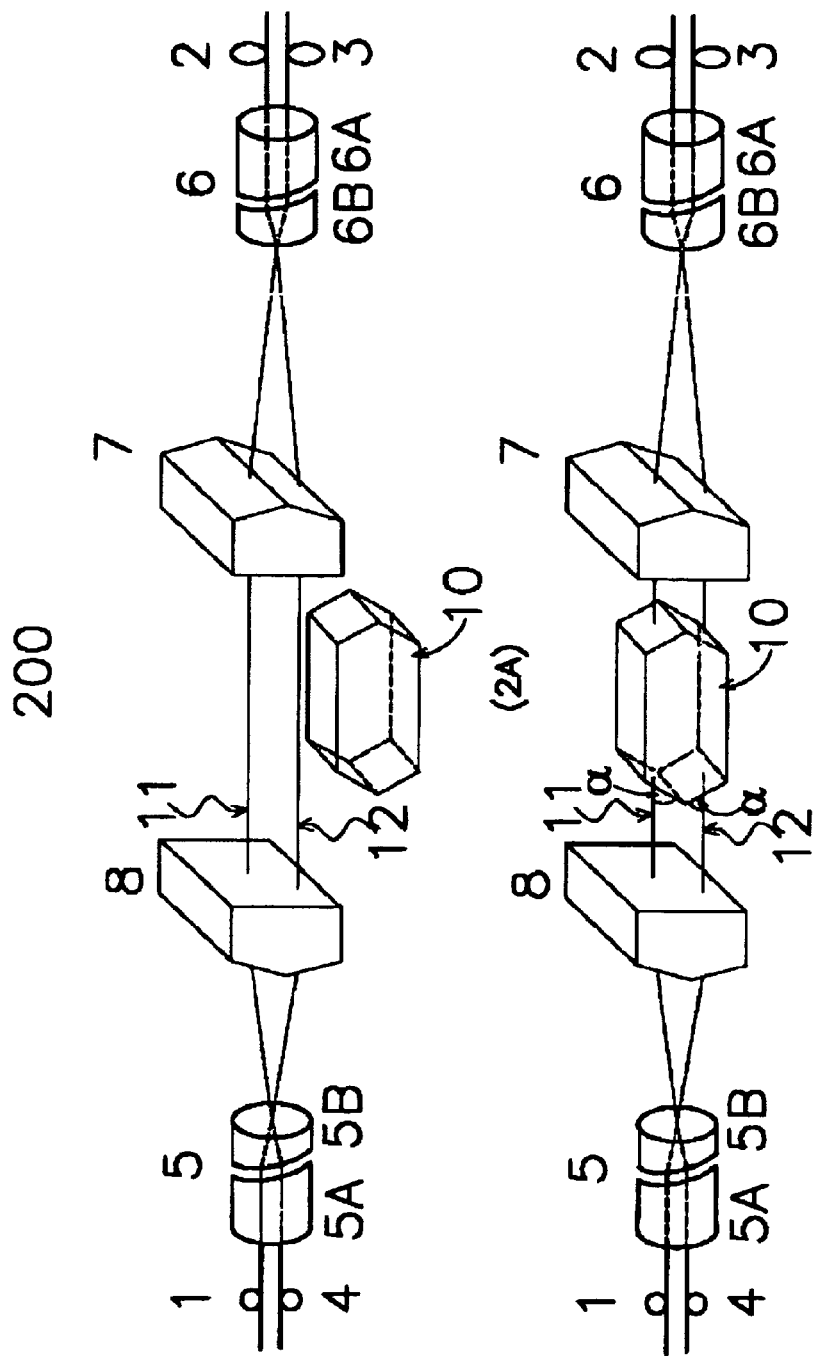
FIGS. 2A–B are schematic views of a mechanical 2×2 switch according to the principles of a second embodiment of the present invention, and illustrate the arrangement of each element within the switch body for this second embodiment.

Referring to FIGS. 2A–B, there is shown a second embodiment of a two-by-two fiber optic switch 200 incorporating aspects of the invention. Switch 200 utilizes the optical elements described above and the same reference numerals are used to refer to the same parts. The switch 200 has four optical fiber ports, a first fiber 1 and a fourth fiber 4 input light beams through a dual collimator 5 and a second fiber 2 and a third fiber 3 receive the light beams through a dual collimator 6 that is placed opposite to collimator 5. The two light beams emitted from the dual collimator 5 have an angle with respect to each other and two light beams incident on collimator 6 need an entry angle in order to optimally couple into the fibers. In the inventive design, light-bending devices 8 and 7 are incorporated to correct the angle separations for collimator 5 and collimator 6, respectively. Therefore, light beam propagation between device 7 and device 8 is parallel.

As is apparent from FIG. 2A, the switch is aligned such that the light beam from fiber 1 propagates along free beam path 12 and enters fiber port 2 and the light beam from fiber 4 propagates along free beam path 11 and enters fiber 3, forming one switching state.

When a beam displacer 10 is placed in beam path 11 and beam path 12, the two light paths exchange position, becoming beam 13 and beam 14, respectively. Therefore, the light beam from fiber 1 is guided to fiber 3 and the light beam from fiber 4 is guided to fiber 2, achieving two-by-two optical switching.

One embodiment of beam displacer 10 is a rhombic-like glass prism, as shown in FIGS. 2A–B, which is based on the same design principles as beam displacer 9 in the first switching embodiment. Displacer 10 essentially combines two parallel plates 9 into one. Instead of two refraction surfaces in device 9, device 10 has four refractive surfaces to displace two beams in opposite directions. Therefore, device 10 exchanges the optical paths of two parallel beams by means of four refractions at their entry and exit points and still maintains the high stability advantages as described in the first embodiment. Similarly, the prism comprises a homogenous transparent solid, preferably having a large index of refraction, such as ZnSe. There is a plane of symmetry through the prism such that the one face of the first pair that contains the entry point and the other face of the second pair that contains the exit point each form an angle α. All opposite planar faces are parallel to each other. As discussed in embodiment 1, this preferred beam displacer design is advantageous because the optical losses of switch 200 are insensitive to small angular and spatial perturbations in the prism alignment. The prism's geometry also minimizes the size of the prism and the shift distance to the prism's activated position.

Referring to FIGS. 3A–B, there is shown a third embodiment of a mechanical wavelength add/drop fiber optic switch 300 incorporating aspects of the invention. Switch 300 utilizes the optical elements described above and the same reference numerals are used to refer to the same parts. The switch 300 has four optical fibers, a first fiber 1 and a fourth fiber 4 couple light beam through a dual collimator 5 and a second fiber 2 and a third fiber 3 couple light beam through a dual collimator 6 that is placed opposite to collimator 5. The two light beams emitted from the dual collimator 5 have an angle with respect to each other and two light beams incident on dual collimator 6 need a separation angle in order to optimally couple into the fibers. In the inventive design, light-bending devices 8 and 7 are incorporated to correct the angle separations for collimator 5 and collimator 6, respectively. Therefore, light beam propagation is parallel between device 7 and device 8.

As shown in FIGS. 3A–B, an input beam 30 from fiber 1 that contains the full spectrum of data ($\lambda_1$ to $\lambda_n$) reaches a thin-film optical filter 15 and is thereby separated into a transmitted beam 32 of a selected wavelength band $\lambda_x$ and a reflected beam 31 containing the rest of wavelength bands. This reflected beam is permanently coupled into the output fiber 4.

Consider a first bypass switching state in which the light path of the selected spectral band is from port 1 to port 4, as indicated in FIG. 3B. In this light path, light beam 32 is reflected back by a right angle prism 16 which is electrically actuated to block the beam. Light beam 32 is efficiently coupled into fiber 4 through the angle corrector 8. Therefore, in this bypass switching state of operation, the incoming optical signal continuously flows through the inventive device with the full spectrum of data.

Next, consider a wavelength add/drop operation state in which the light path for the filtered spectral band $\lambda_x$, beam 32, is from port 1 to port 2 and light path for the substitute add signal of $\lambda_x$, beam 33, is from port 3 to port 4, as indicated in FIG. 3A. In this light path state, in which the moveable prism 16 is out of the light path, the filtered beam 32 is coupled into fiber 2 via angular correctors 8 and 7. Simultaneously, beam 33 that is entered through fiber 3 is focused into fiber 4, as shown in FIG. 3A. Therefore an optical path from fiber port 1 to fiber port 2 for the selected wavelength band $\lambda_x$ is established and at the same time a light path for an added optical signal from port 3 to port 4 is also established. In other words, a pre-defined optical channel is dropped out from the incoming optical data stream and the added signal is simultaneously substituted back into the optical data stream.

The general requirement for device 16 is it should act as a compact retro-reflector. One embodiment of device 16 is a right angle prism, as shown in FIGS. 3A–B. A right angle prism is easy to make and provides good coupling efficiency and stability against small position deviations, commonly associated with mechanical actuators.

The above descriptions of three switch embodiments are very specific examples. It will be apparent to a person of average skill in the art that many variations of the switch are possible within the scope of the invention. Accordingly, the scope of the invention should be determined by the following claims and their legal equivalents.

What is claimed is:

1. An optical switch for coupling a first fiber to a second fiber or to a third fiber, said second fiber and said third fiber being located adjacent to each other along a longitudinal axis and opposite said first fiber along said longitudinal axis, said optical switch comprising:
   a) a first lens for coupling light to and from said first fiber, wherein light from said first fiber exits said first lens along a first optical path substantially parallel to said longitudinal axis;
   b) a second lens for coupling light to and from said second fiber and for coupling light to and from said third fiber, wherein light from said second fiber exits said second lens along a second angled optical path at an angle θ with respect to said longitudinal axis, wherein light from said third fiber exits said second lens along a third angled optical path at an angle θ with respect to said longitudinal axis;
   c) a beam angle corrector, wherein light from said second fiber traveling along said second angled optical path is deflected to propagate along a second parallel optical path, wherein light from said third fiber traveling along said third angled optical path is deflected to propagate along a third parallel optical path, wherein said second and third parallel optical paths are substantially parallel to each other and to said first optical path, wherein said beam angle corrector has a substantially fixed position;
   d) a beam shifter locatable in or out of said first optical path, wherein said first optical path is substantially aligned with said second parallel optical path when said beam shifter is not positioned in said first optical path, wherein said first optical path is substantially aligned with said third parallel optical path when said beam shifter is positioned in said first optical path; and
   e) an actuator capable of moving said beam shifter in and out of said first optical path.

2. The optical switch of claim 1 wherein said angle θ is between 1° and 4°.

3. The optical switch of claim 1 wherein said beam shifter comprises a parallel plate of a homogenous transparent solid.

4. The optical switch of claim 1 wherein said beam shifter comprises ZnSe or ZnS.

5. The optical switch of claim 1 wherein said beam corrector comprises a glass prism.

6. A two-by-two optical switch for coupling light among four fibers, a first fiber and a fourth fiber being located adjacent to each other along a longitudinal axis, and a second and a third fiber being located adjacent to each other and opposite said first and fourth fibers along said longitudinal axis, said two-by-two optical switch comprising:
   a) a first lens for coupling light to and from said first fiber and for coupling light to and from said fourth fiber, wherein light from said first fiber exits said first lens along a first angled optical path at an angle $\theta_1$ with respect to said longitudinal axis, wherein light from said fourth fiber exits said first lens along a fourth angled optical path at an angle $\theta_1$ with respect to said longitudinal axis;
   b) a first beam angle corrector, wherein light from said first fiber traveling along said first angled optical path is deflected to propagate along a first parallel optical path, wherein light from said fourth fiber traveling along said fourth angled optical path is deflected to propagate along a fourth parallel optical path, wherein said first and fourth parallel optical paths are substantially parallel to each other;
   c) a second lens for coupling light to and from said second fiber and for coupling light to and from said third fiber, wherein light from said second fiber exits said second lens along a second angled optical path at an angle $\theta_2$ with respect to said longitudinal axis, wherein light from said third fiber exits said second lens along a third angled optical path at an angle $\theta_2$ with respect to said longitudinal axis;
   d) a second beam angle corrector, wherein light from said second fiber traveling along said second angled optical path is deflected to propagate along a second parallel optical path, wherein light from said third fiber traveling along said third angled optical path is deflected to propagate along a third parallel optical path, wherein said second and third parallel optical paths are substantially parallel to each other;
   e) a beam shifter locatable in or out of said first and fourth parallel optical paths, wherein said first and second parallel optical paths are substantially aligned to each other and said fourth and third optical paths are substantially aligned to each other when said beam shifter is positioned out of said first and fourth parallel optical paths, wherein said first and third parallel optical paths are substantially aligned to each other and said fourth and second optical paths are substantially aligned to each other when said beam shifter is positioned in said first and fourth parallel optical paths; and
   f) an actuator capable of moving said beam shifter in and out of said first and fourth parallel optical paths.

7. The optical switch of claim 6 wherein said angles $\theta_1$ and $\theta_2$ are between 1° and 4°.

8. The optical switch of claim 6 wherein said first and second beam angle correctors each comprise a glass prisms.

9. The optical switch of claim 6 wherein said beam shifter comprises a homogenous transparent solid prism with two sets of parallel surfaces arranged at an angle such that beam shifter exchanges said first and fourth parallel optical paths.

10. The optical switch of claim 6 wherein said beam shifter comprises ZnSe or ZnS.

11. An optical wavelength add/drop switch for wavelength selective coupling among four fibers, a first fiber and a fourth fiber being located adjacent to each other along a longitudinal axis, and a second and a third fiber being located adjacent to each other and opposite said first and fourth fibers along said longitudinal axis, said add/drop switch comprising:
   a) a first lens for coupling light to and from said first fiber and for coupling light to and from said fourth fiber, wherein light from said first fiber exits said first lens along a first angled optical path at an angle $\theta_1$ with respect to said longitudinal axis, wherein light from said fourth fiber exits said first lens along a fourth angled optical path at an angle $\zeta_1$ with respect to said longitudinal axis;
   b) a thin film optical filter receiving light along said first angled optical path, wherein light having a wavelength within a selected wavelength band is transmitted along said first angled optical path, wherein light having a wavelength outside said selected wavelength band is reflected along said fourth angled optical path toward said fourth fiber;

c) a first beam angle corrector, wherein light from said first fiber traveling along said first angled optical path is deflected to propagate along a first parallel optical path, wherein light from said fourth fiber traveling along said fourth angled optical path is deflected to propagate along a fourth parallel optical path, wherein said first and fourth parallel optical paths are substantially parallel to each other;

d) a second lens for coupling light to and from said second fiber and for coupling light to and from said third fiber, wherein light from said second fiber exits said second lens along a second angled optical path at an angle $\theta_2$ with respect to said longitudinal axis, wherein light from said third fiber exits said second lens along a third angled optical path at an angle $\theta_2$ with respect to said longitudinal axis;

e) a second beam angle corrector, wherein light from said second fiber traveling along said second angled optical path is deflected to propagate along a second parallel optical path, wherein light from said third fiber traveling along said third angled optical path is deflected to propagate along a third parallel optical path, wherein said second and third parallel optical paths are substantially parallel to each other;

f) a beam reflector locatable in or out of said first and fourth parallel optical paths, wherein said first and second parallel optical paths are substantially aligned to each other and said fourth and third optical paths are substantially aligned to each other when said beam reflector is positioned out of said first and fourth parallel optical paths, wherein said first and fourth parallel optical paths are substantially aligned to each other when said beam reflector is positioned in said first and fourth parallel optical paths; and g) an actuator capable of moving said beam reflector in and out of said first and fourth parallel optical paths.

12. The add/drop switch of claim 11 wherein said angles $\theta_1$ and $\theta_2$ are between 1° and 4°.

13. The add/drop switch of claim 11 wherein said first and second beam angle correctors each comprise a glass prism.

14. The add/drop optical switch of claim 11 wherein said beam reflector is a right angle reflector comprising a homogenous transparent solid.

* * * * *